(12) United States Patent
    Bito

(10) Patent No.: US 12,537,727 B2
(45) Date of Patent: Jan. 27, 2026

(54) ELECTRONIC DEVICE AND METHOD

(71) Applicant: Kioxia Corporation, Tokyo (JP)

(72) Inventor: Akinori Bito, Yokohama Kanagawa (JP)

(73) Assignee: KIOXIA CORPORATION, Tokyo (JP)

( * ) Notice: Subject to any disclaimer, the term of this patent is extended or adjusted under 35 U.S.C. 154(b) by 0 days.

(21) Appl. No.: 18/806,074

(22) Filed: Aug. 15, 2024

(65) Prior Publication Data

US 2025/0097082 A1    Mar. 20, 2025

(30) Foreign Application Priority Data

Sep. 15, 2023  (JP) .................. 2023-150404

(51) Int. Cl.
    *H04L 25/03*    (2006.01)
    *H04L 25/02*    (2006.01)

(52) U.S. Cl.
    CPC .... *H04L 25/03878* (2013.01); *H04L 25/0272* (2013.01)

(58) Field of Classification Search
    CPC ............. H04L 25/02; H04L 25/03; H04L 25/03006; H04L 25/03343; H04L 25/03878; H04L 25/03885; H04L 25/0264; H04L 25/0272; H04L 25/028; H04L 25/0286; H04L 25/0288; H04L 25/0292; H04L 2025/0335; H04L 2025/03426; G06F 2213/0026; G06F 13/38; G06F 13/40; G06F 13/4004; G06F 13/4027; G06F 13/405; G06F 13/4059; G06F 13/42; G06F 13/4204; G06F 13/4221; G06F 13/382; G06F 13/387
    See application file for complete search history.

(56) References Cited

U.S. PATENT DOCUMENTS

| | | | | |
|---|---|---|---|---|
| 8,159,927 B2 * | 4/2012 | Shakiba | ................... | H04B 3/32 370/466 |
| 8,462,759 B2 * | 6/2013 | Shakiba | ............ | H04L 25/03343 370/344 |
| 8,599,913 B1 * | 12/2013 | Brown | ................ | G06F 13/4027 375/232 |
| 9,825,730 B1 * | 11/2017 | Berke | ................... | H04L 1/0002 |

(Continued)

FOREIGN PATENT DOCUMENTS

JP    2021-197583 A    12/2021

*Primary Examiner* — James M Perez
(74) *Attorney, Agent, or Firm* — Foley & Lardner LLP

(57) ABSTRACT

An electronic device includes a first control circuit and a second control circuit. The first control circuit can acquire, when a first reception circuit and a first transmission circuit transition from a first state of communicating at a first communication speed conforming to a first specification to a second state of communicating at a second communication speed conforming to a second specification, a first adjustment value related to one setting value applied to a third transmission circuit, and transmit the first adjustment value to the second control circuit. The second control circuit can determine, when a second reception circuit and a second transmission circuit transition from the first state to the second state, a second adjustment value which is one setting value applied to a fourth transmission circuit, based on the first adjustment value transmitted from the first control circuit.

20 Claims, 4 Drawing Sheets

(56) References Cited

U.S. PATENT DOCUMENTS

| | | | |
|---|---|---|---|
| 10,503,239 B2 * | 12/2019 | Bito | H04L 12/12 |
| 10,684,672 B2 * | 6/2020 | Koyama | G06F 1/3237 |
| 10,853,212 B2 * | 12/2020 | Das Sharma | G06F 13/4295 |
| 10,880,137 B2 * | 12/2020 | Das Sharma | H04L 27/01 |
| 10,979,258 B1 * | 4/2021 | Chen | H04L 25/0272 |
| 11,159,353 B1 * | 10/2021 | Chen | H04L 25/14 |
| 11,327,861 B2 * | 5/2022 | Das Sharma | G06F 13/4282 |
| 11,442,883 B2 * | 9/2022 | Bito | H04L 25/03343 |
| 11,467,909 B1 * | 10/2022 | Jeon | G06F 13/4221 |
| 11,683,204 B2 * | 6/2023 | Chen | H04L 25/03878 375/233 |
| 11,762,802 B2 * | 9/2023 | Choudhary | G06F 1/10 710/305 |
| 11,860,812 B2 * | 1/2024 | Das Sharma | G11C 29/028 |
| 11,870,612 B2 * | 1/2024 | Chen | H04L 25/0278 |
| 11,901,038 B2 * | 2/2024 | Bito | G11C 7/1093 |
| 12,040,804 B2 * | 7/2024 | Chen | G06F 1/08 |
| 12,052,020 B2 * | 7/2024 | Wang | H03L 7/095 |
| 2008/0201756 A1 * | 8/2008 | Shakiba | H04L 25/0264 725/119 |
| 2010/0043045 A1 * | 2/2010 | Shakiba | H04B 3/32 725/127 |
| 2014/0269881 A1 * | 9/2014 | He | H04L 25/03878 375/231 |
| 2018/0083607 A1 * | 3/2018 | Kanomata | G06F 1/04 |
| 2019/0042380 A1 * | 2/2019 | Das Sharma | G06F 13/4295 |
| 2019/0064909 A1 * | 2/2019 | Bito | G06F 1/325 |
| 2019/0086995 A1 * | 3/2019 | Koyama | G06F 13/4282 |
| 2019/0114281 A1 * | 4/2019 | Li | G06F 13/4027 |
| 2020/0226018 A1 * | 7/2020 | Das Sharma | H04L 1/0041 |
| 2020/0327088 A1 * | 10/2020 | Choudhary | G06F 1/10 |
| 2021/0081288 A1 * | 3/2021 | Das Sharma | G06F 13/4295 |
| 2021/0390073 A1 * | 12/2021 | Bito | H04L 25/03343 |
| 2021/0405108 A1 * | 12/2021 | Strickling | G01R 31/2808 |
| 2022/0123972 A1 * | 4/2022 | Chen | H04L 25/03866 |
| 2023/0065754 A1 * | 3/2023 | Bito | G11C 7/1066 |
| 2023/0342323 A1 * | 10/2023 | Ali | G06F 13/4221 |
| 2023/0350451 A1 * | 11/2023 | Chen | H03L 7/083 |
| 2023/0353158 A1 * | 11/2023 | Wang | G06F 1/10 |
| 2025/0097082 A1 * | 3/2025 | Bito | H04L 25/03878 |

* cited by examiner

FIG. 3

| PS1 DF BOOST | PS1 DE BOOST 0/24 | 1/24 | GP1 ↙2/24 | 3/24 | C+1 4/24 | GP2 ↙5/24 | 6/24 | 7/24 | GP3 ↙8/24 |
|---|---|---|---|---|---|---|---|---|---|
| | ↙0/24 ↙ 0.0 0.0 S4 | 0.0 0.0 | 0.0 1.6 | 0.0 -2.5 2.5 S3 | 0.0 -3.5 3.5 S1 | 0.0 -4.7 4.7 S2 | 0.0 -6.0 6.0 S0 | 0.0 -7.6 7.6 | 0.0 -9.5 9.5 |
| 0/24 | 0.8 0.0 0.8 | 0.8 -0.8 1.6 | 0.9 -1.6 2.5 | 1.0 -2.8 3.5 | 1.2 -3.9 4.7 | 1.3 -5.3 6.0 | 1.6 -6.8 7.6 | 1.9 -8.8 9.5 | |
| 1/24 | 1.6 0.0 0.8 S5 | 1.7 -1.8 2.5 | 1.9 -1.7 3.5 | 2.2 -3.1 4.7 | 2.5 -4.4 6.0 | 2.9 -6.0 7.6 S7 | 3.5 -8.0 9.5 | | |
| 2/24 | 2.5 0.0 1.6 S6 | 2.8 -0.9 3.5 | 3.1 -1.9 4.7 | 3.5 -3.5 6.0 S8 | 4.1 -5.1 7.6 | 4.9 -7.0 9.5 | | | |
| 3/24 | 3.5 0.0 2.5 S9 | 3.9 -1.0 4.7 | 4.4 -2.2 6.0 | 5.1 -4.1 7.6 | 6.0 -6.0 9.5 | | | | |
| 4/24 | 4.7 0.0 3.5 | 5.3 -1.2 6.0 | 6.0 -2.5 7.6 | 7.0 -4.9 9.5 | | | | | |
| 5/24 | 6.0 0.0 4.7 | 6.8 -1.3 7.6 | 8.0 -2.9 9.5 | | | | | | |
| 6/24 | | 6.0 -1.6 6.0 | | | | | | | |
| C-1 | | | | | | | | | |

ELECTRONIC DEVICE AND METHOD

CROSS-REFERENCE TO RELATED APPLICATION

This application is based upon and claims the benefit of priority from Japanese Patent Application No. 2023-150404, filed Sep. 15, 2023, the entire contents of which are incorporated herein by reference.

FIELD

Embodiments described herein relate generally to an electronic device.

BACKGROUND

An interface for connecting electronic devices is known, such as Peripheral Component Interconnect-Express (PCIe) (registered trademark). The electronic device is, for example, a host or a memory system. In such an interface, it is typically desired to reduce a bit error rate (BER) in communication between electronic devices and to maintain a communication quality required for the interface.

DESCRIPTION OF THE DRAWINGS

FIG. 3 is a table showing an example of a TxEQ value according to the present embodiment.

DETAILED DESCRIPTION

Figure 1:
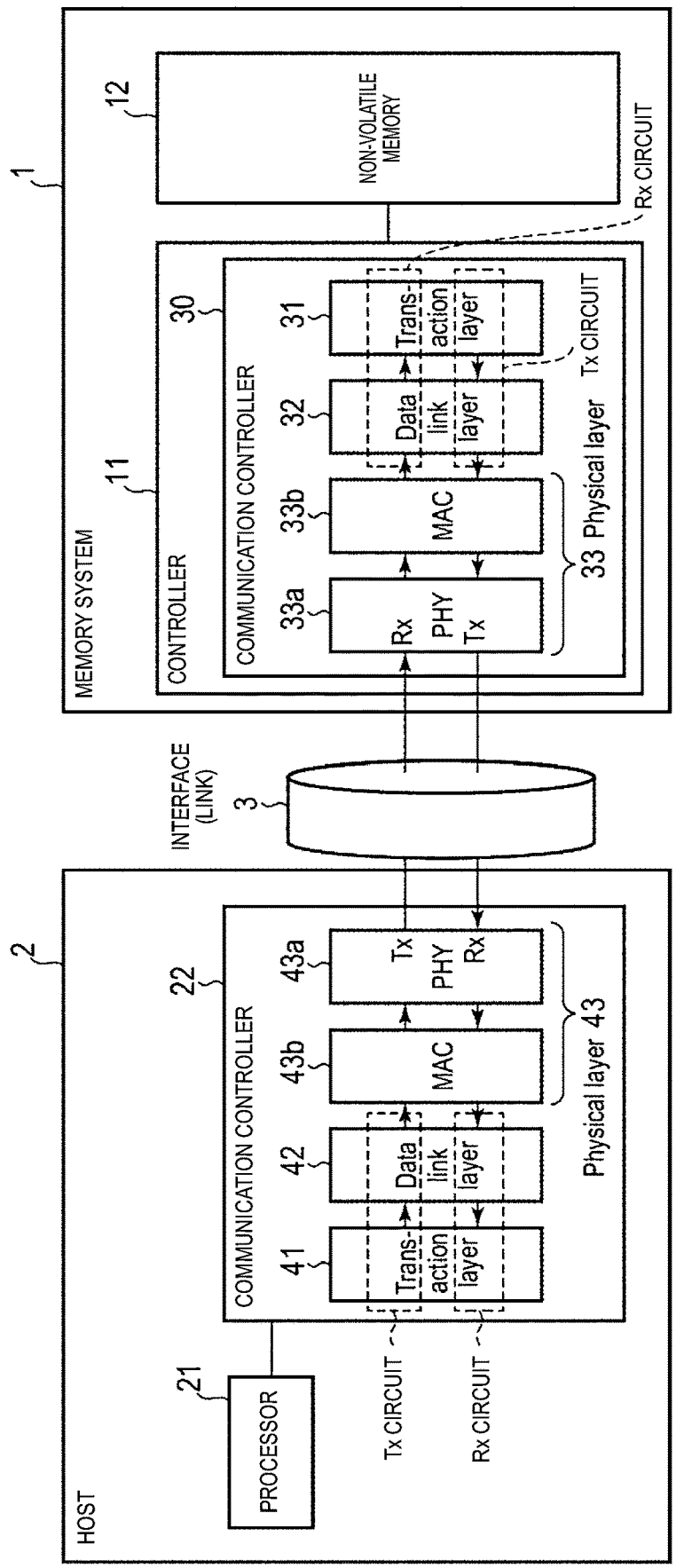
FIG. 1 is a diagram showing a configuration example of an information processing system according to a present embodiment.

Embodiments provide an electronic device capable of maintaining communication quality required for an interface.

In general, according to one embodiment, an electronic device includes a first port, a second port, a first reception circuit, a first transmission circuit, a first control circuit, a second reception circuit, a second transmission circuit, and a second control circuit. The first reception circuit is configured to receive data via the first port. The first transmission circuit is configured to transmit data via the first port. The first control circuit is configured to control the first reception circuit and the first transmission circuit. The second reception circuit is configured to receive data via the second port. The second transmission circuit is configured to transmit data via the second port. The second control circuit is configured to control the second reception circuit and the second transmission circuit. The first control circuit is further configured to: acquire, when the first reception circuit and the first transmission circuit transition from a first state of communicating at a first communication speed conforming to a first specification to a second state of communicating at a second communication speed conforming to a second specification, a first adjustment value related to at least one setting value applied to a third transmission circuit connected to the first port, the second communication speed being different from the first communication speed; and transmit the first adjustment value to the second control circuit. The second control circuit is further configured to determine, when the second reception circuit and the second transmission circuit transition from the first state to the second state, a second adjustment value which is at least one setting value applied to a fourth transmission circuit connected to the second port, based on the first adjustment value transmitted from the first control circuit.

Hereinafter, embodiments of the present disclosure will be described with reference to the drawings. In the specification and drawings, the same elements are denoted by the same reference numerals.

FIG. 1 is a diagram showing a configuration example of an information processing system according to the present embodiment.

The information processing system 100 includes a memory system 1 and a host 2. The memory system 1 and the host 2 are communicably connected by an interface 3. The configuration and operation of the memory system 1 will be described as an example of the electronic device according to the present embodiment. The configuration and operation of the electronic device according to the present embodiment can also be applied to the host 2.

The memory system 1 is, for example, a solid state drive (SSD). The memory system 1 transmits data to the outside through the interface 3. Further, the memory system 1 receives data from the outside via the interface 3.

The host 2 is, for example, a server or a personal computer (PC). The host 2 transmits data to the memory system 1 via the interface 3. The host 2 also receives data from the memory system 1 via the interface 3.

The interface 3 is, for example, a serial interface that conforms to a PCIe specification. The interface 3 includes a link (serial link) for connecting the devices to each other. The link includes a plurality of lanes. Each lane includes a differential signal line pair (Tx+, Tx−) for transmission from the memory system 1 to the host 2 (for reception by the host 2) and a differential signal line pair (Rx+, Rx−) for transmission from the host 2 to the memory system 1 (for reception by the memory system 1).

The host 2 includes a processor 21 and a communication controller 22.

The processor 21 is, for example, an arithmetic processing device. The processor 21 controls each component of the host 2, including the communication controller 22.

The communication controller 22 is, for example, an arithmetic processing device. The communication controller 22 is configured with, for example, a system-on-a-chip (SoC). The communication controller 22 controls communication with the memory system 1. The communication controller 22 includes a transaction layer 41, a data link layer 42, and a physical layer 43.

The physical layer 43 includes a physical (PHY) subblock 43a and a media access control (MAC) subblock 43b.

The memory system 1 includes a controller 11 and a non-volatile memory 12. The controller 11 is configured with, for example, an SoC. The non-volatile memory 12 is, for example, a NAND flash memory.

The controller 11 receives a command from the host 2 and writes data received from the host 2 to the non-volatile memory 12. Alternatively, the controller 11 receives a command from the host 2 and reads data from the non-volatile memory 12. That is, the controller 11 controls the non-volatile memory 12 based on a command received from the host 2.

The controller 11 has a communication controller 30. The communication controller 30 controls communication with the host 2 via the interface 3. The communication controller 30 includes a transaction layer 31, a data link layer 32, and a physical layer 33. In addition, the physical layer 33 includes a physical (PHY) subblock 33a and a media access control (MAC) subblock 33b.

The transaction layers 31 and 41 execute construction and processing of a transaction layer packet (TLP). The TLP is a packet transmitted or received between the transaction layers of the communication partners. For the transaction layer 31, the transaction layer of the communication partner is the transaction layer 41 of the host 2. For the transaction layer 41, the transaction layer of the communication partner is the transaction layer 31 of the memory system 1.

The data link layer 32 is an intermediate layer between the transaction layer 31 and the physical layer 33. The data link layer 42 is an intermediate layer between the transaction layer 41 and the physical layer 43. The data link layers 32 and 42 manage the links provided in the interface 3 and execute construction and processing of a data link layer packet (DLLP). The DLLP is a packet transmitted or received between the data link layers of the communication partners. For the data link layer 32, the data link layer of the communication partner is the data link layer 42 of the host 2. For the data link layer 42, the data link layer of the communication partner is the data link layer 32 of the memory system 1.

The physical layer 33 physically communicates data via a plurality of lanes provided in the link. The configuration of the physical layer 33 will be described in detail below.

The transaction layers 31 and 41 and the data link layers 32 and 42 each include an Rx circuit as a reception circuit and a Tx circuit as a transmission circuit. The Rx circuit receives data received by the physical layer 33 or 43. The Tx circuit transmits data to be transmitted through the physical layer 33 or 43. When the interface 3 includes a plurality of links, the number of Tx circuits and the number of Rx circuits are each the same as the number of links.

Here, link equalization executed at each of a communication speed (8 Gbps) conforming to a third generation PCIe specification (Gen3) and a communication speed (16 Gbps) conforming to a fourth generation PCIe specification (Gen4) will be described.

The optimal output waveforms of data transmitted by the physical layers 33 and 43 may change depending on transmission paths between the communication partners, specifically, a combination of three elements: the partner device; a cable (and/or wiring pattern); and the own device. In addition, the optimal output waveform may be different between an output waveform of data transmitted from the partner device to the own device and an output waveform of data transmitted from the own device to the partner device. In the link equalization, the adjustment of these output waveforms and the adjustment of the equalizer on the reception side are performed. The link equalization is also referred to as training, tuning, or the like. In Gen3 and Gen4, the reception characteristics need to satisfy the bit error rate (BER)<$10^{-12}$.

The link equalization is configured with three Phases of Phase 1 to Phase 3.

Phase 1: Each of the memory system 1 and the host 2 notifies the partner device of the capability of the own device (FS [Full Swing], LF [Low Frequency]). In Phase 1, the reception characteristics need to satisfy BER<$10^{-4}$.

Phase 2: Adjustment is performed on the output waveform of the host 2 such that the reception characteristics of the memory system 1 satisfy BER<$10^{-12}$. In Phase 2, the memory system 1 leads the processing.

Phase 3: The output waveform of the memory system 1 is adjusted such that the reception characteristics of the host 2 satisfy BER<$10^{-12}$. In phase 3, the host 2 leads the processing.

That is, in order to improve the BER of the own device, the memory system 1 needs to control the output waveform of the host 2 in Phase 2.

When the host 2 and the memory system 1 start communication conforming to Gen4 of the PCIe specification, the host 2 and the memory system 1 operate in cooperation with each other to execute link equalization in the order of a communication speed conforming to the first generation PCIe specification (Gen1), a communication speed conforming to Gen3, and a communication speed conforming to Gen4.

Figure 2:
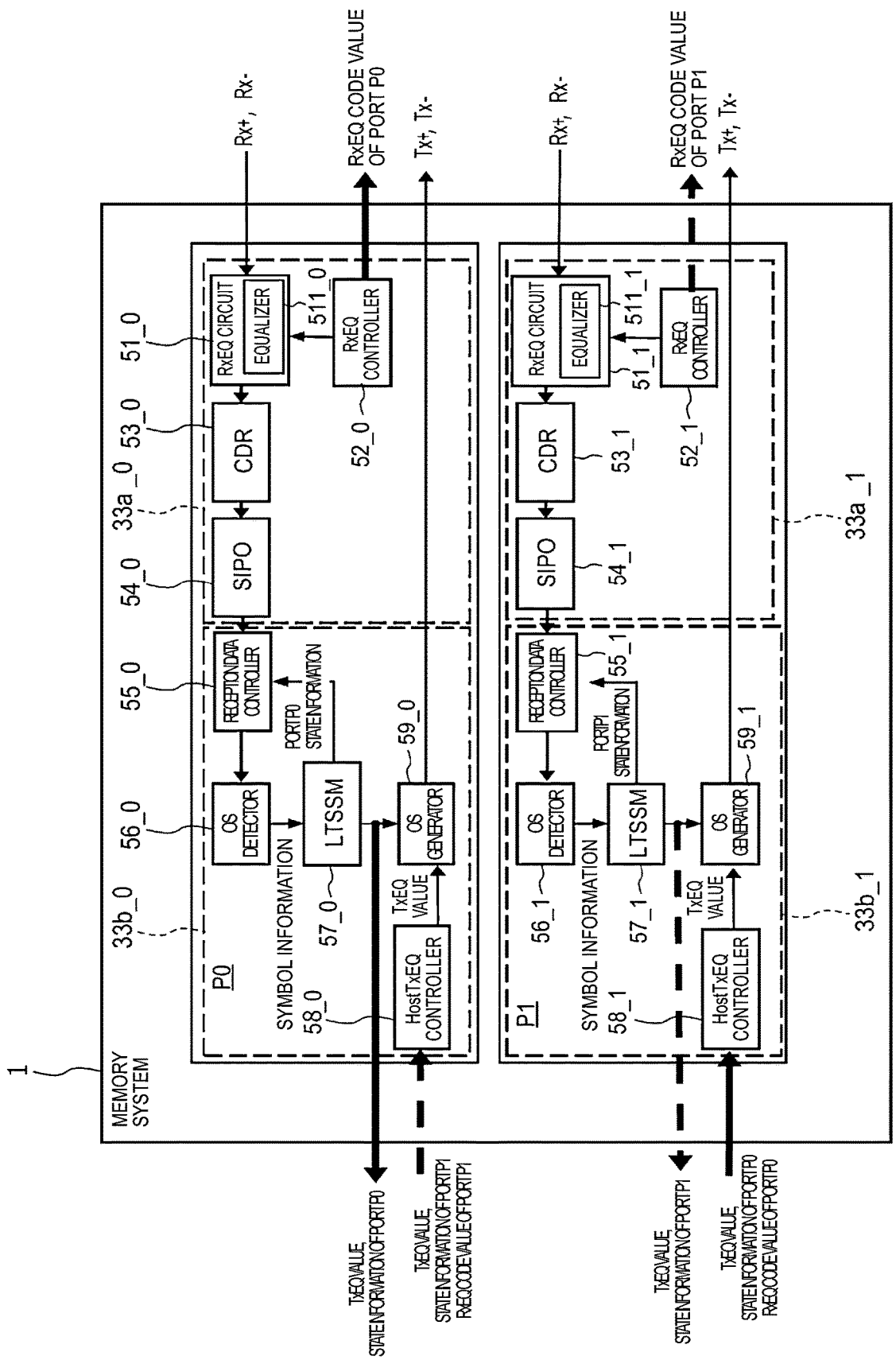
FIG. 2 is a diagram showing a configuration example of a physical layer of an electronic device according to the present embodiment.

FIG. 2 is a diagram showing a configuration example of the physical layer 33 of the memory system 1 according to the present embodiment.

The memory system 1 includes a port P0 and a port P1. The port P0 and the port P1 each include the physical layer 33. The port P0 and the port P1 are each connected to the host 2 independently.

The physical layer 33 of the port P1 includes a PHY subblock 33a_1 and a MAC subblock 33b_1.

The PHY subblock 33a_1 of the port P1 includes a reception side equalization (RxEQ) circuit 51_1, an RxEQ controller 52_1, a clock data recovery (CDR) circuit 53_1, and a serial-in/parallel-out (SIPO) circuit 54_1.

In addition, the MAC subblock 33b_1 of the port P1 includes a reception data controller 55_1, an ordered set (OS) detector 56_1, a link training status state machine (LTSSM) 57_1, a host transmission (HostTxEQ) side equalization controller 58_1, and an OS generator 59_1.

The RxEQ circuit 51_1 is a circuit to receive a signal from the host 2 via a differential signal line pair (Rx+, Rx−) for reception of the memory system 1. The RxEQ circuit 51_1 includes an equalizer 511_1. The equalizer 511_1 is a circuit to adjust (optimize) the quality of the signal (reception signal) received by the RxEQ circuit 51_1.

The RxEQ controller 52_1 controls the RxEQ circuit 51_1. The RxEQ controller 52_1 also outputs an RxEQ code value to the physical layer 33 of the port P0. The RxEQ code value indicates the setting of the equalizer 511_1 for optimizing the quality of the signal received by the RxEQ circuit 51_1 in Gen3 or Gen4. The RxEQ code value is, for example, a setting value of a continuous time linear equalizer (CTLE) or a setting value of a decision feedback equalizer (DFE).

The CDR circuit 53_1 generates a clock from the reception signal received by the RxEQ circuit 51_1. The CDR circuit 53_1 digitally detects 0 or 1 of the reception signal in a cycle of the generated clock. As a result, the CDR circuit 53_1 converts the signal received by the RxEQ circuit 51_1 from an analog signal to a digital signal. The CDR circuit 53_1 transmits the converted digital signal to the SIPO circuit 54_1 as serial data.

The SIPO circuit 54_1 converts the received serial data into parallel data. The SIPO circuit 54_1 transmits the converted parallel data to the reception data controller 55_1.

The OS detector 56_1 detects an ordered set from the data received via the reception data controller 55_1. The OS detector 56_1 outputs symbol information indicating the type of the ordered set when the ordered set is detected. The ordered set is a message that can be communicated between physical layers.

The LTSSM 57_1 transitions to various states based on the symbol information received from the OS detector 56_1.

Further, the LTSSM 57_1 outputs the state information of the port P1 to the reception data controller 55_1. The state information indicates, for example, a phase of link equalization (e.g., Phase 1 to Phase 3) and a communication speed (e.g., Gen1 to Gen4).

When the state information of the port P1 is Recovery.RcvrLock of Gen3 or Gen4, or Recovery.Equalization.Phase 0/1 of Gen3, the reception data controller 55_1 masks the data received from the SIPO circuit 54_1. That is, when the state information of the port P1 is the above, the reception data controller 55_1 does not transmit the received data to the OS detector 56_1.

The Recovery.RcvrLock is a period in which an ordered set having a predetermined pattern is communicated between the physical layer 33 of the port P1 and the host 2 in the Recovery state. The Recovery.Equalization.Phase 0/1 is a period in which the physical layer 33 of the port P1 executes Phase 0 or Phase 1 of the link equalization in the Recovery state.

The reception data controller 55_1 releases the mask of the data received from the SIPO circuit 54_1 and transmits the received data to the OS detector 56_1 in response to the elapse of a standby time.

The LTSSM 57_1 stores a TxEQ value of the host 2 in a register or an internal memory. The TxEQ value is a setting value related to an output waveform of data, and will be described later with reference to FIG. 3. When Phase 2 of link equalization of Gen3 or Gen4 is completed, the LTSSM 57_1 stores a TxEQ value of the host 2 optimized for Gen3 or Gen4 (hereinafter, referred to as Opt_TxEQ_g3h or Opt_TxEQ_g4h). The state information of the LTSSM 57_1 and the TxEQ value of the host 2 (Opt_TxEQ_g3h or Opt_TxEQ_g4h) are output to the physical layer 33 of the port P0.

The HostTxEQ controller 58_1 determines an initial value of the TxEQ value of the host 2 used in Phase 2 of Gen3 or Gen4 (hereinafter, referred to as Ini_TxEQ_g3p2h or Ini_TxEQ_g4p2h). The HostTxEQ controller 58_1 receives an RxEQ code value of the port P0 from an RxEQ controller 52_0 of the port P0. In addition, the HostTxEQ controller 58_1 receives state information and a TxEQ value (Opt_TxEQ_g3h or Opt_TxEQ_g4h) of the port P0 from an LTSSM 57_0 of the port P0.

The HostTxEQ controller 58_1 stores a TxEQ parameter table used to obtain Ini_TxEQ_g3p2h or Ini_TxEQ_g4p2h. The HostTxEQ controller 58_1 stores the table in, for example, a register or an internal memory. The HostTxEQ controller 58_1 obtains the initial values of the TxEQ value (Ini_TxEQ_g3p2h, Ini_TxEQ_g4p2h) of the host 2 in Phase 2 of Gen3 or Gen4 of the port P1 from the table, based on the TxEQ value (Opt_TxEQ_g3h, Opt_TxEQ_g4h) of the host 2 adjusted (optimized) in Gen3 or Gen4 of the port P0, for example. The TxEQ parameter table will be described later with reference to FIG. 3.

The OS generator 59_1 generates various ordered sets. The OS generator 59_1 transmits the generated ordered set to the host 2 via a differential signal line pair (Tx+, Tx−) for transmission from the memory system 1 to the host 2.

The physical layer 33 of the port P0 includes a PHY subblock 33*a*_0 and a MAC subblock 33*b*_0.

The PHY subblock 33*a*_0 of the port P0 includes an RxEQ circuit 51_0, an RxEQ controller 52_0, a CDR circuit 53_0, and a SIPO circuit 54_0. The configurations of the RxEQ circuit 51_0, the RxEQ controller 52_0, the CDR circuit 53_0, and the SIPO circuit 54_0 are the same as those of the RxEQ circuit 51_1, the RxEQ controller 52_1, the CDR circuit 53_1, and the SIPO circuit 54_1, respectively.

In addition, the MAC subblock 33*b*_0 of the port P0 includes a reception data controller 55_0, an OS detector 56_0, the LTSSM 57_0, a HostTxEQ controller 58_0, and an OS generator 59_0. The configurations of the reception data controller 55_0, the OS detector 56_0, the LTSSM 57_0, the HostTxEQ controller 58_0, and the OS generator 59_0 are the same as those of the reception data controller 55_1, the OS detector 56_1, the LTSSM 57_1, the HostTxEQ controller 58_1, and the OS generator 59_1, respectively.

FIG. 3 is a table showing an example of the TxEQ value of the host 2 in Phase 2 of Gen3 or Gen4 according to the present embodiment. In the table of FIG. 3, each setting of the TxEQ of the host 2 (TxEQ value) includes three parameters, that is, de-emphasis (DE), pre-shoot1 (PS1), and boost (BOOST). The DE, PS1, and BOOST are parameters related to a voltage ratio of the TxEQ of the host 2. FIG. 3 shows 42 TxEQ values. The output waveform of the host 2 is changed by changing the parameters DE, PS1, and BOOST. In the present embodiment, the TxEQ values are divided into three groups GP1 to GP3 depending on the characteristics of the output waveform. The TxEQ values having similar characteristics of the output waveforms are classified into the same group. For example, the BOOST of the TxEQ value belonging to the group GP1 is 2.5 decibels or lower. The BOOST of the TxEQ value belonging to the group GP2 is higher than 2.5 decibels and equal to or lower than 6.0 decibels. The BOOST of the TxEQ value belonging to the group GP3 is higher than 6.0 decibels. The TxEQ value may be classified into a group also based on DE or PS1. The number of groups in which the TxEQ values are divided is not limited to 3. The TxEQ values may be classified such that one TxEQ value belongs to a plurality of groups. The HostTxEQ controller 58_1 may store a plurality of TxEQ parameter tables having different grouping.

The memory system 1 requests the host 2 to apply the TxEQ value selected from the TxEQ parameter table in Phase 2 of Gen3 or Gen4. The memory system 1 determines the optimal TxEQ value (Opt_TxEQ_g3h or Opt_TxEQ_g4h) of the host 2 such that the reception characteristics of the memory system 1 satisfy $BER<10^{-12}$ by changing the TxEQ value of the host 2.

Next, an operation of the memory system 1 according to the present embodiment will be described.

Figure 4:
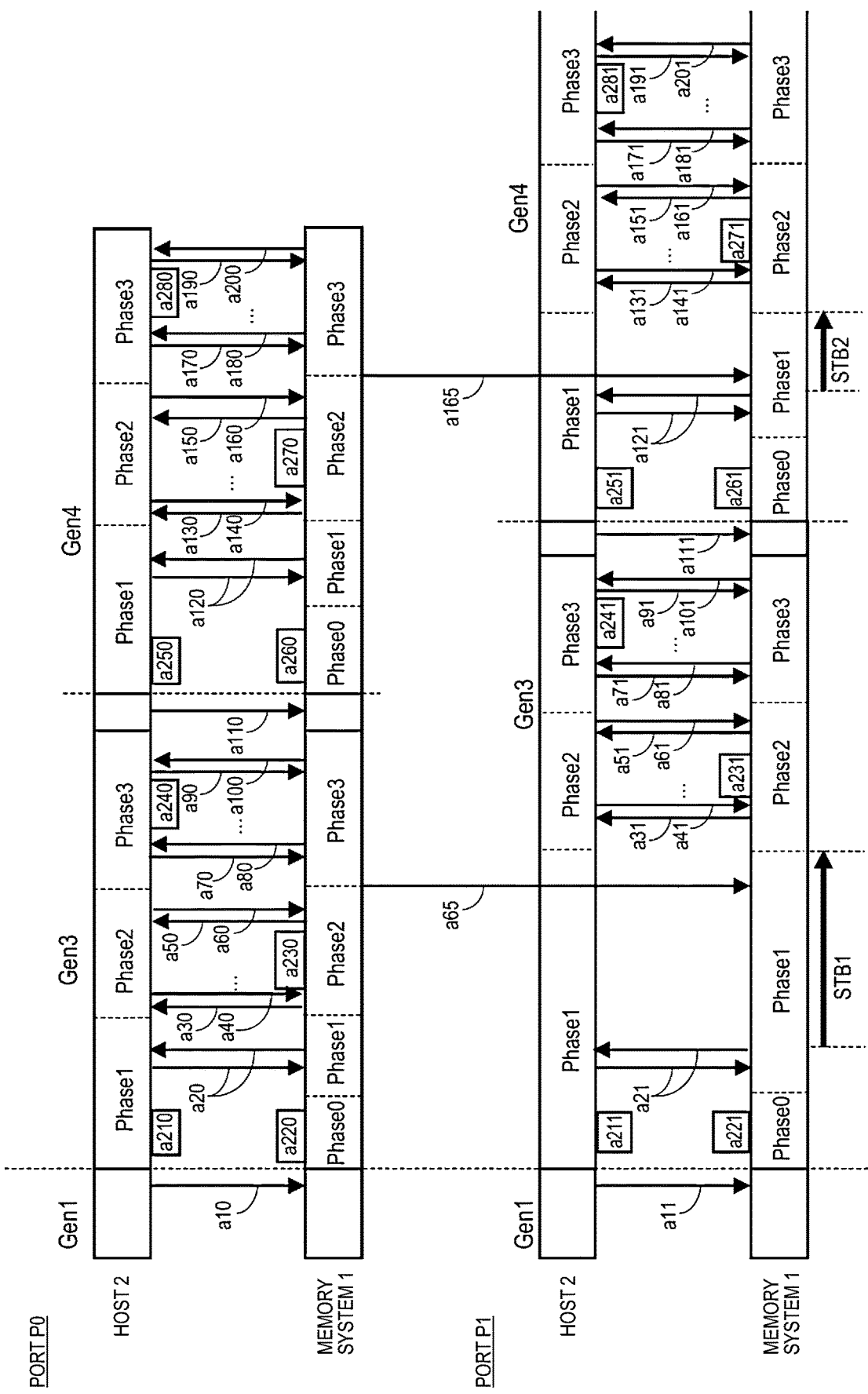
FIG. 4 is a diagram showing an operation example of the electronic device according to the present embodiment.

FIG. 4 is a diagram showing an operation example of the memory system 1 according to the present embodiment.

Gen1

The host 2 transmits an ordered set EQ_TS2 to the port P0 and the port P1 of the memory system 1 at a communication speed conforming to Gen1 (a10, a11). The ordered set EQ_TS2 is an ordered set that specifies the initial value of the TxEQ value Ini_TxEQ_g3d of the memory system 1 in Gen3.

The physical layer 33 of the port P0 and the port P1 receives the ordered set EQ_TS2. The physical layer 33 of the port P0 and the port P1 sets the initial value of the TxEQ value of the memory system 1 in Gen3 to Ini_TxEQ_g3d.

Gen3: Phase 0

The physical layer 33 of the port P0 and the port P1 adjusts the characteristics of the equalizer on the reception side to satisfy the reception characteristics required in Phase 1 according to the reception status of the ordered set EQ_TS2 in a state in which the TxEQ value of the host 2 is unknown (a220, a221). The period for optimizing the characteristics of the equalizer on the reception side is referred to as an RxEQ period.

Gen3: Phase 1

The host 2 adjusts the characteristics of the equalizer on the reception side to satisfy the reception characteristics required in Phase 1 (a210, a211) as a preparation for receiving data which is to be transmitted from the memory system 1 based on the specified initial value of the TxEQ value (Ini_TxEQ_g3d).

In Phase 1, the host 2 and the physical layer 33 of the port P0 of the memory system 1 notify the partner device of the capability of the own device, each other (a20). In Phase 1, the host 2 and the physical layer 33 of the port P1 of the memory system 1 also notify the partner device of the capability of the own device, each other (a21). The physical layer 33 of the port P1 waits until a standby time STB1 elapses after notifying the partner device of the capability of the own device.

Gen3: Phase 2

When Phase 1 is completed, Phase 2 is executed on the port P0 under the lead of the memory system 1. The memory system 1 (more specifically, the physical layer 33 of the port P0) selects any of the settings S0 to S9 of the TxEQ value described with reference to FIG. 3 as the initial value Ini_TxEQ_g3p2h, for example. The memory system 1 requests the host 2 to apply the selected TxEQ value to communication with the port P0 (a30).

The host 2 applies the TxEQ value requested from the memory system 1 to communication with the port P0. The host 2 transmits an ordered set for notifying the applied TxEQ value to the port P0 of the memory system 1 (a40). The memory system 1 can verify that the requested TxEQ value for the port P0 is applied to the host 2 by the received ordered set.

The memory system 1 adjusts the characteristics of the equalizer 511_0 of the port P0 (a230).

The memory system 1 repeats a30, a40, and a230 for a plurality of TxEQ values. The upper limit of a period during which the TxEQ value of the host 2 can be adjusted in Phase 2 is determined. Accordingly, the number of times of executing a30, a40, and a230 for various TxEQ values of the host 2 is limited. Therefore, the number of settings of the TxEQ value applied to the host 2 is limited. For example, the setting of the TxEQ value applied to the host 2 is limited to the settings S0 to S9 belonging to the plurality of groups GP1 to GP3 shown in FIG. 3. Hereinafter, it is also referred to as "sweep" that the memory system 1 applies a certain TxEQ value to the host 2 to adjust the characteristics of the equalizers 511_0 or 511_1 of the port P0 or P1.

The memory system 1 determines a TxEQ value, among the plurality of TxEQ values, for which the best signal quality (for example, the smallest BER) is obtained for the port P0 as an optimum value Opt_TxEQ_g3h0. The memory system 1 requests the host 2 to apply the optimum value Opt_TxEQ_g3h0 as the TxEQ value for the port P0 (a50). For example, it is assumed that the best signal quality is obtained in setting S8 among the settings S0 to S9 of the TxEQ value in FIG. 3. In this case, the memory system 1 determines the setting S8 as the optimum value Opt_TxEQ_g3h0. The memory system 1 requests the host 2 to apply the setting S8 to the port P0.

The host 2 applies the optimum value Opt_TxEQ_g3h0 requested from the memory system 1 to the TxEQ value for the port P0. The host 2 transmits an ordered set for notifying the applied optimum value Opt_TxEQ_g3h0 to the port P0 of the memory system 1 (a60).

The physical layer 33 of the port P0 receives the ordered set for notifying the optimum value Opt_TxEQ_g3h0. The physical layer 33 of the port P0 stores the received ordered set. The ordered set indicates the optimum value of the TxEQ value Opt_TxEQ_g3h0 of the host 2.

When the physical layer 33 of the port P0 (more specifically, LTSSM 57_0) sets the TxEQ value of the host 2 to the optimum value Opt_TxEQ_g3h0, the physical layer 33 of the port P0 transmits the state information STp0 indicating that Phase 2 of Gen3 is completed (that is, indicating that the optimum value Opt_TxEQ_g3h0 is acquired) to the physical layer 33 of the port P1 (a65). In addition, the physical layer 33 of the port P0 transmits the optimum value of the TxEQ value Opt_TxEQ_g3h0 of the host 2 and the RxEQ code value of the RxEQ circuit 51_0 at this time, to the port P1.

The physical layer 33 of the port P1 transitions from Phase 1 (standby state) to Phase 2 after the standby time STB1 elapses. Phase 2 at the port P1 is also executed under the lead of the memory system 1.

When the physical layer 33 of the port P1 receives the state information STp0, the physical layer 33 of the port P1 selects the initial value of the TxEQ value (Ini_TxEQ_g3p2h) of the host 2 in Phase 2 of the port P1 based on the optimum value of the TxEQ value Opt_TxEQ_g3h0 of the host 2 determined in the port P0. The physical layer 33 of the port P1 selects, for example, the initial value of the TxEQ value in Phase 2 of the port P1 from the group to which the optimum value Opt_TxEQ_g3h0 at the port P0 belongs among the groups GP1 to GP3 shown in FIG. 3. For example, when the optimum value Opt_TxEQ_g3h0 is S8, the physical layer 33 of the port P1 selects the initial value of the TxEQ value in Phase 2 of the port P1 from the group GP2. The physical layer 33 of the port P1 requests the host 2 to apply the selected initial value to communication with the port P1 (a31). When the state information STp0 is not received from the port P0 until the standby time STB1, the physical layer 33 of the port P1 selects a predetermined value as the initial value of the TxEQ value in Phase 2 of the port P1. In this case, the physical layer 33 of the port P1 may sweep the TxEQ parameter table without specifying the groups GP1 to GP3.

The physical layer 33 of the port P1 may select the initial value of the TxEQ value in Phase 2 of the port P1 further in accordance with the RxEQ code value received from the port P0. For example, the physical layer 33 of the port P1 may determine which of the plurality of TxEQ parameter tables stored in the HostTxEQ controller 58_1 to use, according to the RxEQ code value. Alternatively, the physical layer 33 of the port P1 may select the initial value of the TxEQ value in Phase 2 from a group different from the group to which the optimum value Opt_TxEQ_g3h0 belongs, in accordance with the RxEQ code value. For example, when the setting value of the CTLE or the DFE is the maximum value or the minimum value in the settable range, the initial value of the TxEQ value in Phase 2 may be selected from a group different from the group to which the optimum value Opt_TxEQ_g3h0 belongs.

The host 2 applies the TxEQ value requested from the memory system 1 to communication with the port P1. The host 2 transmits an ordered set for notifying the applied TxEQ value to the port P1 of the memory system 1 (a41).

The memory system 1 can verify that the requested TxEQ value for the port P1 is applied in the host 2 by the received ordered set.

The memory system 1 adjusts the characteristics of the equalizer 511_1 of the port P1 (a231).

In the memory system 1, a31, a41, and a231 are repeated for the plurality of TxEQ values in the group, among the groups GP1 to GP3, to which the optimum value Opt_TxEQ_g3h0 in the port P0 belongs. For example, when the optimum value Opt_TxEQ_g3h0 belongs to the group GP2, the memory system 1 executes a31, a41, and a231 for the plurality of TxEQ values in the group GP2. That is, the memory system 1 repeats the sweep for the plurality of TxEQ values in the group GP2.

As described above, the upper limit of the period in which the TxEQ value of the host 2 can be adjusted in Phase 2 is determined. However, a TxEQ value applied to the host 2 for the port P1 is limited to TxEQ values of the group GP2. Therefore, the memory system 1 can repeatedly sweep a plurality of TxEQ values in the port P1, which are similar to the optimum value of the TxEQ value Opt_TxEQ_g3h0 for the port P0. As a result, it is highly possible that a TxEQ value for obtaining the best signal quality in the port P1 is obtained in the limited adjustment period.

The memory system 1 determines the TxEQ value for which the best signal quality among the plurality of TxEQ values is obtained for the port P1 in the group GP2, as an optimum value Opt_TxEQ_g3h1. The memory system 1 requests the host 2 to apply the optimum value Opt_TxEQ_g3h1 as the TxEQ value for the port P1 (a51).

The host 2 applies the optimum value Opt_TxEQ_g3h1 requested from the memory system 1 to the TxEQ value for the port P1. The host 2 transmits an ordered set for notifying the applied optimum value Opt_TxEQ_g3h1 to the port P1 of the memory system 1 (a61).

The physical layer 33 of the port P1 receives the ordered set for notifying the optimum value Opt_TxEQ_g3h1. The physical layer 33 of the port P1 stores the received ordered set. The ordered set indicates the optimum value of the TxEQ value Opt_TxEQ_g3h1 of the host 2.

The memory system 1 ends Phase 2 in the port P1.

Gen3: Phase 3

When Phase 2 is completed in the port P0, Phase 3 of the port P0 is executed under the lead of the host 2. The host 2 selects any of settings of the TxEQ values of the memory system 1. The host 2 requests the port P0 of the memory system 1 to apply the selected TxEQ value (a70).

The memory system 1 applies the TxEQ value requested by the host 2 to the port P0. The memory system 1 transmits an ordered set for notifying the applied TxEQ value to the host 2 (a80).

The host 2 adjusts the characteristics of the equalizer on the reception side of the physical layer 43 connected to the port P0 of the memory system 1 (a240).

The host 2 repeats a70, a80, and a240 for a plurality of TxEQ values.

The host 2 determines the TxEQ value for which the best signal quality among the plurality of TxEQ values is obtained for the port P0 as an optimum value Opt_TxEQ_g3d0. The host 2 requests the application of the optimum value Opt_TxEQ_g3d0 to the memory system 1 as the TxEQ value of the port P0 (a90).

The memory system 1 applies the optimum value Opt_TxEQ_g3d0 requested by the host 2 to the TxEQ value of the port P0. The memory system 1 transmits an ordered set for notifying the applied optimum value Opt_TxEQ_g3d0 to the host 2 (a100).

As a result, the link equalization is completed for the port P0 at the communication speed conforming to Gen3.

Further, when Phase 2 is completed in the port P1, Phase 3 of the port P1 is executed under the lead of the host 2. The host 2 selects any of settings of the TxEQ values of the memory system 1. The host 2 requests the port P1 of the memory system 1 to apply the selected TxEQ value (a71).

The memory system 1 applies the TxEQ value requested by the host 2 to the port P1. The memory system 1 transmits an ordered set for notifying the applied TxEQ value to the host 2 (a81).

The host 2 adjusts the characteristics of the equalizer on the reception side of the physical layer 43 connected to the port P1 of the memory system 1 (a241).

The host 2 repeats a71, a81, and a241 for a plurality of TxEQ values.

The host 2 determines the TxEQ value for which the best signal quality among the plurality of TxEQ values is obtained for the port P1 as an optimum value Opt_TxEQ_g3d1. The host 2 requests the application of the optimum value Opt_TxEQ_g3d1 as the TxEQ value of the port P1 to the memory system 1 (a91).

The memory system 1 applies the optimum value Opt_TxEQ_g3d1 requested by the host 2 to the TxEQ value of the port P1. The memory system 1 transmits an ordered set for notifying the applied optimum value Opt_TxEQ_g3d1 to the host 2 (a101).

As a result, the link equalization is completed for the port P1 at the communication speed conforming to Gen3.

When the link equalization of Gen3 is completed, the host 2 and the memory system 1 execute the link equalization at a communication speed conforming to Gen4.

The host 2 transmits an ordered set EQ_TS2 to the port P0 and the port P1 of the memory system 1 at the communication speed conforming to Gen3 (a110, a111). The ordered set EQ_TS2 is an ordered set that specifies the initial value of the TxEQ value Ini_TxEQ_g4d of the memory system 1 in Gen4. The physical layer 33 of the port P0 and the port P1 may transmit the ordered set EQ_TS2 for specifying the initial value of the TxEQ value Ini_TxEQ_g4p1h of the host 2 in Phase 1 of Gen4 in the vicinity of the timing of a110 or a111. When an optimum value (Opt_TxEQ_g4h0), which is to be described later, is already obtained in the port P0, the physical layer 33 of the port P1 may select the initial value Ini_TxEQ_g4p1h based on the optimum value Opt_TxEQ_g4h0.

Gen4: Phase 0

The physical layer 33 of the port P0 and the port P1 adjusts the characteristics of the equalizer on the reception side to satisfy the reception characteristics required in Phase 1 according to the reception status of the ordered set EQ_TS2 (a260, a261).

Gen4: Phase 1

The host 2 adjusts the characteristics of the equalizer on the reception side to satisfy the reception characteristics required in Phase 1 (a250, a251) as a preparation for receiving data which is to be transmitted from the memory system 1 based on the specified initial value of the TxEQ (Ini_TxEQ_g4d).

In Phase 1, the host 2 and the physical layer 33 of the port P0 of the memory system 1 notify the partner device of the capability of the own device, each other (a120). In Phase 1, the host 2 and the physical layer 33 of the port P1 of the memory system 1 also notify the partner device of the capability of the own device, each other (a121). The port P1 waits until a standby time STB2 elapses after the own device notifies the partner device of the capability.

Gen4: Phase 2

When Phase 1 is completed, Phase 2 is executed on the port P0 under the lead of the memory system 1. The memory system 1 (more specifically, the physical layer 33 of the port P0) selects the initial value of the TxEQ value in Phase 2 of Gen4, as in Phase 2 of Gen3. The memory system 1 requests the host 2 to apply the selected TxEQ value to communication with the port P0 (a130).

The host 2 applies the TxEQ value requested from the memory system 1 to communication with the port P0. The host 2 transmits an ordered set for notifying the applied TxEQ value to the port P0 of the memory system 1 (a140).

The memory system 1 adjusts the characteristics of the equalizer 511_0 of the port P0 (a270).

The memory system 1 repeats a130, a140, and a270 for a plurality of TxEQ values. That is, the memory system 1 repeats the sweep for the plurality of TxEQ values. In Phase 2 of Gen4, the upper limit of the period for obtaining the TxEQ value of the host 2 is also determined. Therefore, the number of times of the sweep is limited. For example, the setting of the TxEQ value applied to the host 2 is limited to the settings S0 to S9 shown in FIG. 3.

The memory system 1 determines a TxEQ value, among the plurality of TxEQ values, for which the best signal quality is obtained for the port P0 as an optimum value Opt_TxEQ_g4h0. The memory system 1 requests the host 2 to apply the optimum value Opt_TxEQ_g4h0 as the TxEQ value for the port P0 (a150).

The host 2 applies the optimum value Opt_TxEQ_g4h0 requested from the memory system 1 to the TxEQ value for the port P0. The host 2 transmits an ordered set for notifying the applied optimum value Opt_TxEQ_g4h0 to the port P0 of the memory system 1 (a160).

The physical layer 33 of the port P0 receives the ordered set for notifying the optimum value Opt_TxEQ_g4h0. The physical layer 33 of the port P0 stores the received ordered set. The ordered set indicates the optimum value of the TxEQ value Opt_TxEQ_g4h0 of the host 2.

When the physical layer 33 of the port P0 (more specifically, LTSSM 57_0) sets the TxEQ value of the host 2 to the optimum value Opt_TxEQ_g4h0, the physical layer 33 of the port P0 transmits the state information STp0 indicating that Phase 2 of Gen4 is completed (that is, indicating that the optimum value Opt_TxEQ_g4h0 is acquired) to the physical layer 33 of the port P1 (a165). In addition, the physical layer 33 of the port P0 transmits the optimum value of the TxEQ value Opt_TxEQ_g4h0 of the host 2 and the RxEQ code value of the RxEQ circuit 51_0 to the port P1.

The physical layer 33 of the port P1 transitions from Phase 1 (standby state) to Phase 2 after the standby time STB2 elapses. Phase 2 at the port P1 is also executed under the lead of the memory system 1. Note that the standby times STB1 and STB2 are determined in accordance with predetermined time limits from the start to the completion of Gen3 and Gen4, respectively.

When the physical layer 33 of the port P1 receives the state information STp0, the physical layer 33 of the port P1 selects the initial value of the TxEQ value (Ini_TxEQ_g4p2h) of the host 2 in Phase 2 of the port P1 based on the optimum value of the TxEQ value Opt_TxEQ_g4h0 of the host 2 determined in the port P0. The physical layer 33 of the port P1 selects, for example, the initial value of the TxEQ value in Phase 2 of the port P1 from the group to which the optimum value Opt_TxEQ_g4h0 at the port P0 belongs among the groups GP1 to GP3 shown in FIG. 3. For example, when the optimum value Opt_TxEQ_g4h0 is S7, the physical layer 33 of the port P1 selects the initial value of the TxEQ value in Phase 2 of the port P1 from the group GP3. The physical layer 33 of the port P1 requests the host 2 to apply the selected TxEQ value to communication with the port P1 (a131). When the state information STp0 is not received from the port P0 until the standby time STB2, the physical layer 33 of the port P1 selects a predetermined value as the initial value of the TxEQ value in Phase 2 of the port P1.

The physical layer 33 of the port P1 may select an initial value of the TxEQ value in Phase 2 of the port P1 further in accordance with the RxEQ code value received from the port P0 as in Gen3.

The host 2 applies the TxEQ value requested from the memory system 1 to communication with the port P1. The host 2 transmits an ordered set for notifying the applied TxEQ value to the port P1 of the memory system 1 (a141).

The memory system 1 adjusts the characteristics of the equalizer 511_1 of the port P1 (a271).

In the memory system 1, a131, a141, and a271 are repeated for the plurality of TxEQ values in the group, among the groups GP1 to GP3, to which the optimum value Opt_TxEQ_g4h0 in the port P0 belongs. For example, when the optimum value Opt_TxEQ_g4h0 belongs to the group GP3, the memory system 1 executes a131, a141, and a271 for the plurality of TxEQ values in the group GP3. That is, the memory system 1 repeats the sweep for the plurality of TxEQ values in the group GP3.

As in Phase 2 of Gen3, since a TxEQ value applied to the host 2 for the port P1 is limited to TxEQ values of the group GP3, it is highly possible to obtain a TxEQ value for which the best signal quality is obtained even in the port P1 in the limited adjustment period.

The memory system 1 determines the TxEQ value for which the best signal quality among the plurality of TxEQ values is obtained for the port P1 in the group GP3, as an optimum value Opt_TxEQ_g4h1. The memory system 1 requests the host 2 to apply the optimum value Opt_TxEQ_g4h1 as the TxEQ value for the port P1 (a151).

The host 2 applies the optimum value Opt_TxEQ_g4h1 requested from the memory system 1 to the TxEQ value for the port P1. The host 2 transmits an ordered set for notifying the applied optimum value Opt_TxEQ_g4h1 to the port P1 of the memory system 1 (a161).

The physical layer 33 of the port P1 receives the ordered set for notifying the optimum value Opt_TxEQ_g4h1. The physical layer 33 of the port P1 stores the received ordered set. The ordered set indicates the optimum value of the TxEQ value Opt_TxEQ_g4h1 of the host 2.

The memory system 1 ends Phase 2 in the port P1.

Gen4: Phase 3

When Phase 2 is completed in the port P0, Phase 3 of the port P0 is executed under the lead of the host 2. Here, a170, a180, a190, a200, and a280 of Phase 3 of Gen4 in the port P0 are the same as a70, a80, a90, a100, and a240 of Phase 3 of Gen3, respectively. Further, a171, a181, a191, a201, and a281 of Phase 3 of Gen4 in the port P1 are the same as a71, a81, a91, a101, and a241 of Phase 3 of Gen3, respectively.

As a result, the link equalization is completed for the port P0 and the port P1 at the communication speed conforming to Gen4.

When link equalization is required in Gen5 or newer generations, the host 2 and the memory system 1 execute the link equalization in the same manner as Gen3 or Gen4.

In the present embodiment, the memory system 1 obtains the initial value and the optimum value of the TxEQ value of the host 2 in Phase 2 of Gen3 (or Gen4) of the port P1 based on the optimum value of the TxEQ value Opt_TxEQ_g3h0 (or Opt_TxEQ_g4h0) of the host 2 in Phase 2 of Gen3 (or Gen4) of the port P0. Alternately, the memory system 1 may determine the initial value and the optimum value of the TxEQ value of the host 2 in Phase 2 of Gen3 (or Gen4) of the port P0 based on the optimum value of the TxEQ value Opt_TxEQ_g3h1 (or Opt_TxEQ_g4h1) of the host 2 in Phase 2 of Gen3 (or Gen4) of the port P1.

The memory system 1 according to the present embodiment determines the initial value and the optimum value of the TxEQ value of the host 2 in Phase 2 of Gen3 of the port P1 based on the optimum value of the TxEQ value Opt_TxEQ_g3h0 of the host 2 in Phase 2 of Gen3 of the port P0. In addition, the memory system 1 determines the initial value and the optimum value of the TxEQ value of the host 2 in Phase 2 of Gen4 of the port P1 based on the optimum value of the TxEQ value Opt_TxEQ_g4h0 of the host 2 in Phase 2 of Gen4 of the port P0. As a result, the accuracy of optimizing the TxEQ value of the host 2 can be improved in the port P1. Therefore, in the port P1, it is highly possible to satisfy the BER required in Gen3 and Gen4 (for example, $BER<10^{-12}$). That is, the memory system 1 can improve the communication quality required for the interface.

Further, according to the present embodiment, in Phase 2 of Gen3 and Gen4 of the port P1, the memory system 1 limits the range to be swept based on the optimized TxEQ values of the host 2 in the port P0 (Opt_TxEQ_g3h0, Opt_TxEQ_g4h0). By the above, in Phase 2 of Gen3 or Gen4 of the port P1, the TxEQ value of the host 2 is swept in a range narrower than the sweep range of the port P0. Therefore, the number of times of sweeping in Phase 2 of Gen3 and Gen4 of the port P1 can be reduced. As a result, the RxEQ period of the memory system 1 can be shortened.

Modification Example

The host 2 may omit Phase 2 and Phase 3 in link equalization of Gen4. Even when Phase 2 and Phase 3 of Gen4 are omitted, the memory system 1 needs to satisfy the reception characteristics ($BER<10^{-12}$) required for Gen4.

In the memory system 1 of the present modification example, the initial value of the TxEQ value (Ini_TxEQ_g4p2h) of the host 2 in Phase 2 of Gen4 of the port P1 is determined based on the optimum value of the TxEQ value (Opt_TxEQ_g3h0) of the host 2 obtained in Phase 2 of Gen3 of the port P0. Since the initial value of the TxEQ value (Ini_TxEQ_g4p2h) is the optimum TxEQ value of the host 2 in Gen3, the possibility of satisfying the reception characteristics required for Gen4 can be increased even when Phase 2 and Phase 3 of Gen4 are omitted.

The above-described embodiment may be applied to a communication speed conforming to a next-generation PCIe specification that is subsequent to the fourth generation. In addition, the above-described embodiment may be applied to an interface specification other than the PCIe specification.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. An electronic device comprising:
   a first port;
   a second port;
   a first reception circuit configured to receive data via the first port;
   a first transmission circuit configured to transmit data via the first port;
   a first control circuit configured to control the first reception circuit and the first transmission circuit;
   a second reception circuit configured to receive data via the second port;
   a second transmission circuit configured to transmit data via the second port; and
   a second control circuit configured to control the second reception circuit and the second transmission circuit,
   wherein the first control circuit is further configured to:
      acquire, when the first reception circuit and the first transmission circuit transition from a first state of communicating at a first communication speed conforming to a first specification to a second state of communicating at a second communication speed conforming to a second specification, a first adjustment value related to at least one setting value applied to a third transmission circuit connected to the first port, the second communication speed being different from the first communication speed; and
      transmit the first adjustment value to the second control circuit; and
   the second control circuit is further configured to:
      determine, when the second reception circuit and the second transmission circuit transition from the first state to the second state, a second adjustment value which is at least one setting value applied to a fourth transmission circuit connected to the second port, based on the first adjustment value transmitted from the first control circuit.

2. The electronic device according to claim 1,
   wherein the first control circuit is further configured to:
      in the second state, measure reception characteristics of the first reception circuit each time a plurality of the setting values are applied to the third transmission circuit; and
      acquire a setting value having best reception characteristics of the first reception circuit, among the plurality of setting values applied to the third transmission circuit, as the first adjustment value, and
   the second control circuit is further configured to:
   in the second state,
      when measuring reception characteristics of the second reception circuit each time a plurality of setting values are applied to the fourth transmission circuit, determine a first setting value to be applied to the fourth transmission circuit first among the plurality of the setting values to be applied to the fourth transmission circuit, based on the first adjustment value.

3. The electronic device according to claim 2, wherein the reception characteristics of the first reception circuit is a bit error rate (BER) of the data received by the first reception circuit, and the first control circuit is further configured to acquire a setting value having a smallest BER of the first reception circuit among the plurality of setting values applied to the third transmission circuit, as the first adjustment value.

4. The electronic device according to claim 2, wherein the plurality of setting values applied to the third transmission circuit or the fourth transmission circuit are classified into a plurality of groups, each of the plurality of groups including one or more of the plurality of setting values, the plurality of groups including at least a first group in which the first adjustment value is included, each of the one or more setting values included in the first group is larger than a first value and smaller than a second value, and the second control circuit is further configured to determine the first setting value from the one or more setting values included in the first group.

5. The electronic device according to claim 4, wherein the second control circuit is further configured to determine the second adjustment value from the one or more setting values included in the first group by applying each of the one or more setting values included in the first group to the fourth transmission circuit.

6. The electronic device according to claim 1, wherein the first control circuit is further configured to transmit state information indicating that the first adjustment value is acquired to the second control circuit, and the second control circuit is further configured to:
when the second reception circuit and the second transmission circuit transition from the first state to the second state,
  wait for a process of determining the second adjustment value until the state information is received; and
  start the process of determining the second adjustment value based on the first adjustment value, in response to receiving the state information.

7. The electronic device according to claim 1, wherein the first control circuit is further configured to:
acquire, when the first reception circuit and the first transmission circuit transition from the second state to a third state of communicating at a third communication speed conforming to a third specification, the third communication speed being different from the second communication speed, a third adjustment value related to at least one setting value applied to the third transmission circuit; and
transmit the third adjustment value to the second control circuit; and the second control circuit is further configured to:
determine, when the second reception circuit and the second transmission circuit transition from the second state to the third state, a fourth adjustment value, which is at least one setting value applied to the fourth transmission circuit, based on the third adjustment value transmitted from the first control circuit.

8. The electronic device according to claim 1, wherein the first control circuit is further configured to:
acquire a fifth adjustment value related to at least one setting value applied to the first reception circuit; and
transmit the fifth adjustment value to the second control circuit; and the second control circuit is further configured to:
determine the second adjustment value based on the first adjustment value and the fifth adjustment value transmitted from the first control circuit.

9. The electronic device according to claim 8, wherein the first control circuit is further configured to acquire a setting value having best reception characteristics of the first reception circuit among a plurality of the setting values applied to the first reception circuit, as the fifth adjustment value.

10. The electronic device according to claim 1, wherein
the first control circuit is configured to acquire the first adjustment value in a link equalization, and
the second control circuit is configured to determine the second adjustment value in the link equalization.

11. An electronic device comprising:
a first control circuit and a second control circuit;
the first control circuit configured to:
  acquire, when a first reception circuit and a first transmission circuit transition from a first state of communicating at a first communication speed conforming to a first specification to a second state of communicating at a second communication speed conforming to a second specification, a first adjustment value related to at least one setting value applied to a third transmission circuit connected to a first port, the second communication speed being different from the first communication speed; and
  transmit the first adjustment value to the second control circuit; and
the second control circuit configured to:
  determine, when a second reception circuit and a second transmission circuit transition from the first state to the second state, a second adjustment value which is at least one setting value applied to a fourth transmission circuit connected to a second port, based on the first adjustment value transmitted from the first control circuit.

12. The electronic device according to claim 11, wherein the first control circuit is further configured to:
in the second state,
  measure reception characteristics of the first reception circuit each time a plurality of the setting values are applied to the third transmission circuit; and
  acquire a setting value having best reception characteristics of the first reception circuit, among the plurality of setting values applied to the third transmission circuit, as the first adjustment value, and the second control circuit is further configured to:
in the second state,
  when measuring reception characteristics of the second reception circuit each time a plurality of setting values are applied to the fourth transmission circuit, determine a first setting value to be applied to the fourth transmission circuit first among the plurality of the setting values to be applied to the fourth transmission circuit, based on the first adjustment value.

13. A method of controlling communication in an electronic device, comprising:
   transitioning a first reception circuit and a first transmission circuit from a first state of communicating at a first communication speed conforming to a first specification to a second state of communicating at a second communication speed conforming to a second specification, the second communication speed being different from the first communication speed;
   acquiring a first adjustment value related to at least one setting value applied to a third transmission circuit connected to first reception circuit;
   transitioning a second reception circuit and a second transmission circuit from the first state to the second state; and
   determining a second adjustment value which is at least one setting value applied to a fourth transmission circuit connected to the second reception circuit, based on the first adjustment value.

14. The method according to claim 13, further comprising:
   in the second state,
      measuring reception characteristics of the first reception circuit each time a plurality of the setting values are applied to the third transmission circuit;
      acquiring a setting value having best reception characteristics of the first reception circuit, among the plurality of setting values applied to the third transmission circuit, as the first adjustment value;
      in measuring reception characteristics of the second reception circuit each time a plurality of setting values are applied to the fourth transmission circuit, determining a first setting value to be applied to the fourth transmission circuit first among the plurality of the setting values to be applied to the fourth transmission circuit, based on the first adjustment value.

15. The method according to claim 14,
   wherein the reception characteristics of the first reception circuit is a bit error rate (BER) of the data received by the first reception circuit, and
   the method further comprises:
   acquiring a setting value having a smallest BER of the first reception circuit among the plurality of setting values applied to the third transmission circuit, as the first adjustment value.

16. The method according to claim 14,
   wherein the plurality of setting values applied to the third transmission circuit or the fourth transmission circuit are classified into a plurality of groups, each of the plurality of groups including one or more of the plurality of setting values, the plurality of groups including at least a first group in which the first adjustment value is included, each of the one or more setting values included in the first group is larger than a first value and smaller than a second value, and
   the method further comprises:
   determining the first setting value from the one or more setting values included in the first group.

17. The method according to claim 16, further comprising:
   determining the second adjustment value from the one or more setting values included in the first group by applying each of the one or more setting values included in the first group to the fourth transmission circuit.

18. The method according to claim 13, further comprising:
   waiting for a process of determining the second adjustment value until the first adjustment value is acquired; and
   starting the process of determining the second adjustment value based on the first adjustment value, in response to the first adjustment value being acquired.

19. The method according to claim 13, further comprising:
   acquiring a fifth adjustment value related to at least one setting value applied to the first reception circuit; and
   determining the second adjustment value based on the first adjustment value and the fifth adjustment value.

20. The method according to claim 19, further comprising:
   acquiring a setting value having best reception characteristics of the first reception circuit among a plurality of the setting values applied to the first reception circuit, as the fifth adjustment value.

* * * * *